United States Patent
Grablowitz et al.

(10) Patent No.: US 10,934,386 B2
(45) Date of Patent: Mar. 2, 2021

(54) POLYURETHANE DISPERSIONS OF LOW HARDNESS

(71) Applicant: Covestro Deutschland AG, Leverkusen (DE)

(72) Inventors: Hans Georg Grablowitz, Cologne (DE); Thomas Feller, Solingen (DE)

(73) Assignee: Covestro Deutschland AG, Leverkusen (DE)

( * ) Notice: Subject to any disclaimer, the term of this patent is extended or adjusted under 35 U.S.C. 154(b) by 171 days.

(21) Appl. No.: 16/320,120

(22) PCT Filed: Jul. 26, 2017

(86) PCT No.: PCT/EP2017/068922
§ 371 (c)(1),
(2) Date: Jan. 24, 2019

(87) PCT Pub. No.: WO2018/019904
PCT Pub. Date: Feb. 1, 2018

(65) Prior Publication Data
US 2019/0225738 A1 Jul. 25, 2019

(30) Foreign Application Priority Data

Jul. 28, 2016 (EP) .................................... 16181780
Sep. 21, 2016 (EP) .................................... 16190008

(51) Int. Cl.
*C08G 18/73* (2006.01)
*C08G 18/10* (2006.01)
(Continued)

(52) U.S. Cl.
CPC ....... *C08G 18/664* (2013.01); *C08G 18/0828* (2013.01); *C08G 18/10* (2013.01);
(Continued)

(58) Field of Classification Search
CPC .. C08G 18/664; C08G 18/0828; C08G 18/10; C08G 18/283; C08G 18/12;
(Continued)

(56) References Cited

U.S. PATENT DOCUMENTS 9,206,331 B2   12/2015   Zastrow et al.

FOREIGN PATENT DOCUMENTS

CA   2253119 A1   5/1999
CN   104004160 A * 8/2014
(Continued)

OTHER PUBLICATIONS

International Search Report for PCT/EP2017/068922 dated Oct. 19, 2017.
(Continued)

*Primary Examiner* — Kara B Boyle
(74) *Attorney, Agent, or Firm* — Faegre Drinker Biddle & Reath LLP

(57) ABSTRACT

The present invention relates to aqueous polyurethane dispersions comprising pentamethylene diisocyanate and to coatings obtainable therefrom. Said coatings, given a high density of urethane and urea groups, are softer than coatings that are obtained with polyurethane dispersions comprising other aliphatic diisocyanates, for example hexamethylene diisocyanate.

13 Claims, 1 Drawing Sheet

(51) Int. Cl.
| | |
|---|---|
| *C08G 18/12* | (2006.01) |
| *C08G 18/66* | (2006.01) |
| *C08G 18/72* | (2006.01) |
| *C08G 18/32* | (2006.01) |
| *C08G 18/42* | (2006.01) |
| *C08G 18/08* | (2006.01) |
| *C09D 175/06* | (2006.01) |
| *C08G 18/28* | (2006.01) |
| *C08G 18/38* | (2006.01) |
| *C08G 18/70* | (2006.01) |
| *D06N 3/14* | (2006.01) |
| *C08G 18/18* | (2006.01) |
| *C08G 18/24* | (2006.01) |

(52) U.S. Cl.
CPC ........... *C08G 18/12* (2013.01); *C08G 18/283* (2013.01); *C08G 18/3206* (2013.01); *C08G 18/3814* (2013.01); *C08G 18/4238* (2013.01); *C08G 18/706* (2013.01); *C08G 18/722* (2013.01); *C08G 18/73* (2013.01); *C09D 175/06* (2013.01); *D06N 3/148* (2013.01); *C08G 18/1808* (2013.01); *C08G 18/244* (2013.01); *D06N 2209/1642* (2013.01)

(58) Field of Classification Search
CPC .................. C08G 18/3814; C08G 18/706; C08G 18/722; C08G 18/73; C08G 18/3206; C08G 18/4238; C08G 18/1808; C08G 18/244; C09D 175/06; D06N 3/148; D06N 2209/1642
See application file for complete search history.

(56) References Cited

FOREIGN PATENT DOCUMENTS

| | | | |
|---|---|---|---|
| DE | 2446440 A1 | 4/1976 | |
| EP | 0916647 A2 | 5/1999 | |
| EP | 2377895 A1 * | 10/2011 | ........... C09D 175/06 |
| EP | 2684867 A1 | 1/2014 | |
| GB | 1462597 A | 1/1977 | |

OTHER PUBLICATIONS

Written Opinion of the International Searching Authority for PCT/EP2017/068922 dated Oct. 19, 2017.

* cited by examiner

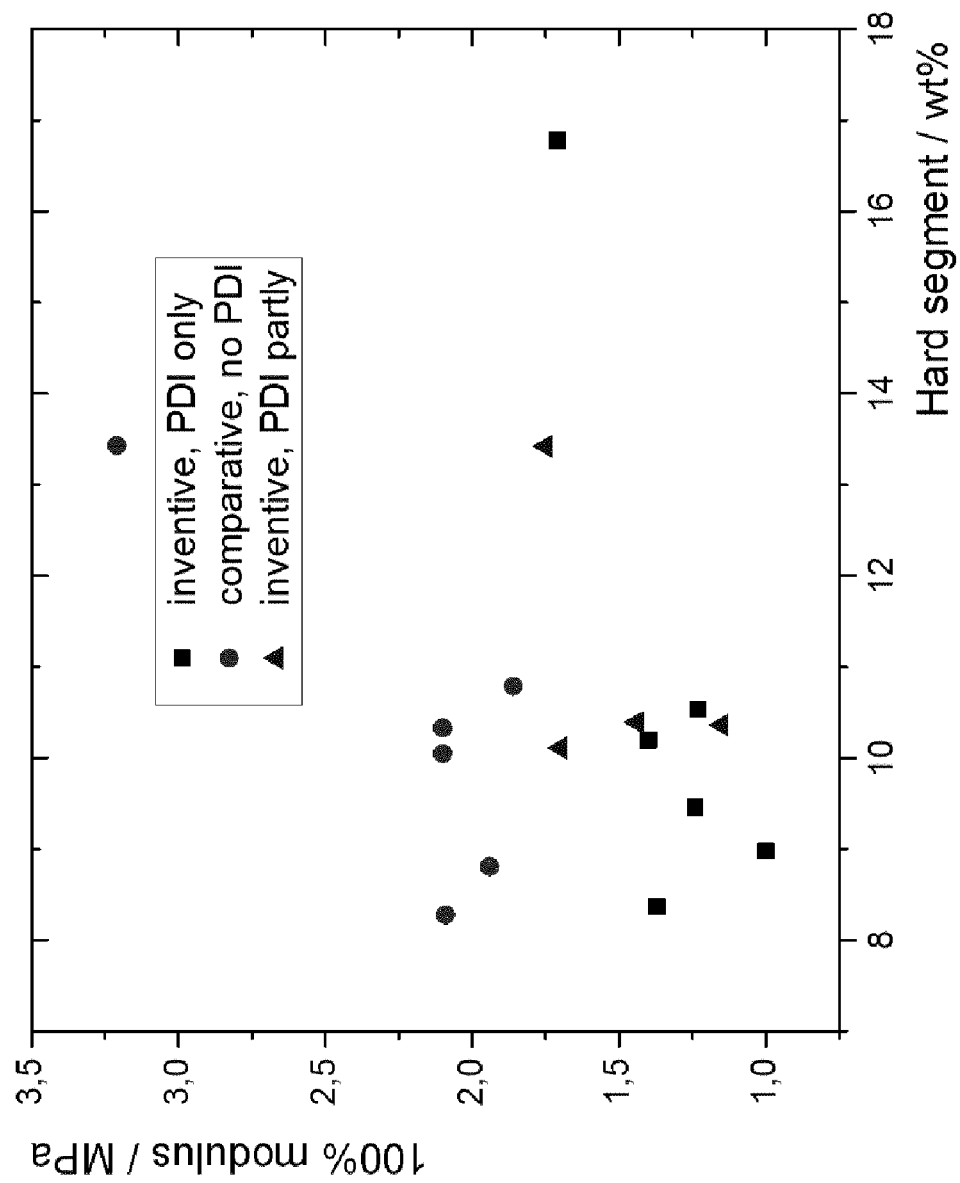

POLYURETHANE DISPERSIONS OF LOW HARDNESS

CROSS-REFERENCE TO RELATED APPLICATIONS

This application is a national stage application (under 35 U.S.C. § 371) of PCT/EP2017/068922, filed Jul. 26, 2017, which claims benefit of European Application Nos. 16181780.4, filed Jul. 28, 2016, and 16190008.9, filed Sep. 21, 2016, all of which are incorporated herein by reference in their entirety.

The present invention relates to aqueous polyurethane dispersions comprising pentamethylene diisocyanate and to coatings obtainable therefrom. Said coatings, given a comparable concentration of urethane and urea groups, are softer than coatings that are obtained with polyurethane dispersions comprising other aliphatic diisocyanates, for example hexamethylene diisocyanate.

Polyurethane dispersions are used for production of various coatings. Depending on the specific end use, different properties of the coating are desired. The painting of automobile bodies, for example, requires coatings of high hardness.

By contrast, in the case of coatings in the textile sector, for example in the production of synthetic leather, high hardness is specifically not desired. In principle, the hardness can be adjusted via the density of (concentration of) "hardening" groups, especially urethane and urea groups (=hard segment), in the polyurethane dispersion. Polyurethane dispersions having relatively small proportions of these groups (i.e. a relatively low hard segment content) are softer. However, a small proportion of urea and urethane groups in the coating does not just lead to the desired effect of a lower hardness, but also to the undesirable effect of a drop in the resistance of the coating to chemicals, for example solvents. This is also deleterious to the washability of such a synthetic PU leather, since the coating is less stable overall as a result of the absence of physical crosslinking sites. Consequently, the setting of the content of hardening groups (hard segment content) in a polyurethane dispersion for textile coating is always based on the balance between the desired softness and the required chemical and physical stability of the coating.

In the study underlying the present invention, it was found that, surprisingly, the replacement of other aliphatic isocyanates, especially hexamethylene diisocyanate (HDI), by pentamethylene diisocyanate (PDI) leads to coatings which, given the same content of hardening groups (hard segment content), are much softer. It is thus possible through the use of PDI, with equal chemical stability, to obtain much more flexible coatings.

The present invention relates, in a first embodiment, to a polyurethane dispersion comprising a polyurethane component A comprising (i) an isocyanate component A1 comprising at least one isocyanate, where the proportion of pentamethylene diisocyanate (PDI) in the isocyanate component A1 is at least 50 mol %;
(ii) at least one component selected from the group consisting of a polyol A2 which has a number-average molecular weight of at least 400 g/mol and is amorphous in the polyurethane component A, and a polyol A6 having a molecular weight of less than 400 g/mol;
(iii) at least one component selected from the group consisting of a compound A3 having at least two isocyanate-reactive groups and at least one ionically or potentially ionically hydrophilizing group and a compound A4 having at least one isocyanate-reactive group and at least one nonionically hydrophilizing group; and
(iv) a polyamine A5;
characterized in that the hard segment content of the polyurethane component A is between 5% and 22% by weight and the 100% modulus of a coating produced with the polyurethane dispersion is not more than 1.8 MPa.

A polyurethane component A as defined above comprises components A1 to A5 as building blocks. Hence, said components are not present as separate compounds. They are rather chemically linked to give the polyurethane component A.

The proportion of the isocyanate component A1 in the polyurethane component A is preferably 8% to 30% by weight, more preferably 12% to 25% by weight.

The proportion of the polyol component A2 in the polyurethane component A is preferably 60% to 89% by weight, more preferably 62% to 85% by weight.

The proportion of the polyol component A6 in the polyurethane component A is preferably 0.25% to 7% by weight %, more preferably 1% to 5% by weight.

The proportion of the ionically or potentially ionically hydrophilizing component A3 in the polyurethane component A is preferably 1.5% to 7.5% by weight, more preferably 2.5% to 6.5% by weight.

The proportion of the nonionically hydrophilizing component A4 in the polyurethane component A is preferably 5% to 10% by weight, more preferably 6.5% to 4.2% by weight. This is preferably the case when only a component A4 and no component A3 is used.

The proportion of the polyamine component A5 in the polyurethane component A is preferably 0.5% to 8% by weight, more preferably 0.9% to 6.7% by weight.

In a preferred embodiment of the invention, the polyurethane component A comprises a polyol component A2, but no polyol component A6.

In a particularly preferred embodiment of the invention, the polyurethane component A does not comprise any further components apart from components A1, A2, A3, A4, A5 and A6. Particular preference is given to polyurethane components A consisting of formation components A1, A2, A4 and A5. Particular preference is likewise given to polyurethane components A consisting of formation components A1, A2, A3 and A5. Preference is further given to polyurethane components A consisting of formation components A1, A6, A3 and A5. Preference is further given to polyurethane components A consisting of formation components A1, A6, A4 and A5.

Isocyanate Component A1

The isocyanate component A1 preferably consists of one or more isocyanates selected from the group consisting of aliphatic polyisocyanates, cycloaliphatic polyisocyanates, araliphatic polyisocyanates and aromatic polyisocyanates. More preferably, the polyisocyanate component A1 consists of aliphatic and/or cycloaliphatic polyisocyanates. Since coatings formed from cycloaliphatic polyisocyanates have greater hardness compared to coatings composed of aliphatic isocyanates, the use of aliphatic isocyanates is particularly preferred.

The term "polyisocyanate" includes those compounds that arise through oligomerization of the polyisocyanates mentioned in this section of the application. Typical oligomers contain at least one urethane, isocyanurate, allophanate, biuret, uretdione, iminooxadiazinedione structure.

A polyisocyanate in the context of the present application is a compound where the molecules contain an average of more than one isocyanate group. Preferably, the average isocyanate functionality per molecule is at least two.

Preferred aliphatic isocyanates are butylene diisocyanate, hexamethylene diisocyanate (HDI), 2,2,4-trimethylhexamethylene diisocyanate, 2,4,4-trimethylhexamethylene diisocyanate and isocyanatomethyloctane 1,8-diisocyanate.

Preferred cycloaliphatic isocyanates are isophorone diisocyanate (IPDI), bis(4,4'-isocyanatocyclohexyl)methane and cyclohexylene 1,4-diisocyanate.

Preferred araliphatic isocyanates are 1,3-bis(isocyanatomethyl)benzene (m-xylylene diisocyanate, m-XDI), 1,4-bis(isocyanatomethyl)benzene (p-xylylene diisocyanate, p-XDI), 1,3-bis(2-isocyanatopropan-2-yl)benzene (m-tetramethylxylylene diisocyanate, m-TMXDI), 1,4-bis(2-isocyanatopropan-2-yl)benzene (p-tetramethylxylylene diisocyanate, p-TMXDI), 1,3-bis(isocyanatomethyl)-4-methylbenzene, 1,3-bis(isocyanatomethyl)-4-ethylbenzene, 1,3-bis(isocyanatomethyl)-5-methylbenzene, 1,3-bis(isocyanatomethyl)-4,5-dimethylbenzene, 1,4-bis(isocyanatomethyl)-2,5-dimethylbenzene, 1,4-bis(isocyanatomethyl)-2,3,5,6-tetramethylbenzene, 1,3-bis(isocyanatomethyl)-5-tert-butylbenzene, 1,3-bis(isocyanatomethyl)-4-chlorobenzene, 1,3-bis(isocyanatomethyl)-4,5-dichlorobenzene, 1,3-bis(isocyanatomethyl)-2,4,5,6-tetrachlorobenzene, 1,4-bis(isocyanatomethyl)-2,3,5,6-tetrachlorobenzene, 1,4-bis(isocyanatomethyl)-2,3,5,6-tetrabromobenzene, 1,4-bis(2-isocyanatoethyl)benzene and 1,4-bis(isocyanatomethyl)naphthalene.

Preferred aromatic isocyanates are phenylene 1,4-diisocyanate, tolylene 2,4-diisocyanate, tolylene 2,6-diisocyanate, naphthylene 1,5-diisocyanate, diphenylmethane 2,4'-diisocyanate or diphenylmethane 4,4'-diisocyanate and triphenylmethane 4,4',4"-triisocyanate.

It is preferable that the polyurethane component A according to the invention, apart from the aforementioned polyisocyanates, does not contain any significant proportions of other compounds having isocyanate groups. This is the case when the proportion of isocyanate groups that are not part of the isocyanate component A1 is less than 10 mol %, preferably less than 5 mol % and more preferably less than 1 mol %. Most preferably, the polyurethane dispersion according to the invention, apart from the abovementioned isocyanates, does not contain any further compounds having isocyanate groups.

In a preferred embodiment of the present invention, the isocyanate component A1 contains at least 80 mol %, more preferably at least 85 mol %, even more preferably at least 90 mol % and most preferably at least 95 mol % of pentamethylene diisocyanate. Most preferably, the isocyanate component A1 consists of PDI.

Polyol A2

The polyol A2 is a compound having an average molecular weight of at least 400 g/mol, where the molecules contain an average of more than one hydroxyl group. Preferably, the average hydroxyl functionality per molecule is at least two. The average molecular weight is preferably the number-average molecular weight.

The polyol A2 is characterized in that it is amorphous after incorporation into the polyurethane component A. An amorphous polyol in the context of the present application, after polymerization as soft segment, has an enthalpy of fusion $\Delta mH$ of less than 10 J/g to DIN EN ISO 11357-3.

In principle, all polyols known to those skilled in the art can be used as polyol A2, provided that they fulfil the abovementioned conditions. Preferably, however, the polyol A2 is a polyester polyol.

Suitable polyols A2 are di- or polyols having a number-average molecular weight in the range from 500 to 13 000 g/mol, preferably 700 to 4000 g/mol. Preference is given to polymers having a mean hydroxyl functionality of 1.5 to 2.5, preferably of 1.8 to 2.2, more preferably of 1.9 to 2.1. These include, for example, polyester alcohols based on aliphatic, cycloaliphatic and/or aromatic di-, tri- and/or polycarboxylic acids with di-, tri- and/or polyols and lactone-based polyester alcohols. Instead of the free polycarboxylic acids, it is also possible to use the corresponding polycarboxylic anhydrides or corresponding polycarboxylic esters of lower alcohols for preparation of the polyesters.

Suitable diols are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate, preference being given to the three latter compounds. In order to achieve a functionality <2, it is possible to use proportions of polyols having a functionality of 3, for example trimethylolpropane, glycerol, erythritol, pentaerythritol, trimethylolbenzene or trishydroxyethyl isocyanurate.

Suitable dicarboxylic acids are phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid and succinic acid. Anhydrides of these acids may likewise be used, where they exist. For the purposes of the present invention, the anhydrides are consequently covered by the expression "acid". It is also possible to use monocarboxylic acids such as benzoic acid and hexanecarboxylic acid, provided that the mean functionality of the polyol is 2. Saturated aliphatic or aromatic acids are preferred, such as adipic acid or isophthalic acid. One example of a polycarboxylic acid for optional additional use in smaller amounts is trimellitic acid.

Examples of hydroxycarboxylic acids that may be used as co-reactants in the preparation of a polyester polyol having terminal hydroxyl groups include hydroxycaproic acid, hydroxybutyric acid, hydroxydecanoic acid, hydroxystearic acid and the like. Usable lactones include ε-caprolactone, butyrolactone and homologues.

Preferred polyols A2 contain, as acid component, at least one compound selected from the group consisting of adipic acid, phthalic acid and isophthalic acid and, as diol, at least one compound selected from the group consisting of butanediol, neopentyl glycol, hexanediol, ethylene glycol and diethylene glycol.

Particular preference is given to polyols A2 based on adipic acid and at least one compound selected from the group consisting of butanediol, neopentyl glycol and hexanediol or based on phthalic acid and at least one compound selected from the group consisting of butanediol, neopentyl glycol and hexanediol. More preferably, the polyols A2 according to the invention contain a maximum of 5% by weight of further formation components in addition to the aforementioned formation components. Most preferably, the polyols A2 according to the invention consist of the aforementioned formation components.

Preferred polyester alcohols are reaction products of adipic acid with hexanediol, butanediol or neopentyl glycol or mixtures of the said dials of molecular weight 500 to 4000, more preferably 800 to 2500.

Likewise suitable are polyether polyols obtainable by polymerization of cyclic ethers or by reaction of alkylene oxides with a starter molecule. Examples include the polyethylene glycols and/or polypropylene glycols of mean molecular weight 500 to 13000, and also polytetrahydrofurans of molecular weight 500 to 8000, preferably 800 to 3000. Likewise suitable are hydroxyl-terminated polycondensates obtainable by reaction of diols or else lactone-modified diols or else bisphenols, for example bisphenol A, with phosgene or carbonic diesters such as diphenyl carbonate or dimethyl carbonate. Examples include the polymeric carbonates of hexane-1,6-diol of mean molecular weight 500 to 8000, and the carbonates of reaction products of hexane-1,6-diol with ε-caprolactone in a molar ratio of 1 to 0.1. Preference is given to the aforementioned polycarbonatediols of molecular weight 800 to 3000 based on hexane-1,6-diol and/or carbonates of reaction products of hexane-1,6-diol with ε-caprolactone in a molar ratio of 1 to 0.33. Hydroxyl-terminated polyamide alcohols and hydroxyl-terminated polyacrylatediols, e.g. Tegomer® BD 1000 (from Tego GmbH, Essen, Germany), are likewise usable.

Ionically Hydrophilizing Compounds A3

Preferred ionic or potentially ionic compounds A3 are, for example, mono- and dihydroxycarboxylic acids, mono- and diaminocarboxylic acids, mono- and dihydroxysulphonic acids, mono- and diaminosulphonic acids and mono- and dihydroxyphosphonic acids or mono- and diaminophosphonic acids and salts thereof, such as dimethylolpropionic acid, dimethylolbutyric acid, hydroxypivalic acid, N-(2-aminoethyl)-β-alanine, 2-(2-aminoethylamino)ethanesulphonic acid, ethylenediaminepropyl- or -butylsulphonic acid, propylene-1,2- or -1,3-diamine-β-ethylsulphonic acid, malic acid, citric acid, glycolic acid, lactic acid, glycine, alanine, taurine, lysine, 3,5-diaminobenzoic acid, an addition product of IPDI and acrylic acid (EP-A 0 916 647, Example 1) and the alkali metal and/or ammonium salts thereof; the adduct of sodium bisulphite onto but-2-ene-1,4-diol, polyethersulphonate, the propoxylated adduct of 2-butenediol and NaHSO₃, described, for example, in DE-A 2 446 440 (pages 5-9, formulae I-III), and units that can be converted to cationic groups, such as N-methyldiethanolamine, as hydrophilic formation components. Preferred ionic or potentially ionic compounds are those having carboxyl or carboxylate and/or sulphonate groups and/or ammonium groups. Particularly preferred ionic compounds are those containing carboxyl and/or sulphonate groups as ionic or potentially ionic groups, such as the salts of N-(2-aminoethyl)-β-alanine, of 2-(2-aminoethylamino)ethanesulphonic acid or of the addition product of IPDI and acrylic acid (EP-A 0 916 647, Example 1) and of dimethylolpropionic acid.

In a preferred embodiment, the polyurethane component A comprises a component A3 having at least two isocyanate-reactive groups and at least one ionically or potentially ionically hydrophilizing group. Most preferably, the polyurethane component A comprises only a component A3 and no component A4.

Nonionically Hydrophilizing Compounds A4

Suitable nonionically hydrophilizing compounds A4 are, for example, polyoxyalkylene ethers containing at least one hydroxyl or amino group. These polyethers contain a proportion of 30% by weight to 100% by weight of units derived from ethylene oxide. Useful compounds include polyethers of linear construction having a functionality between 1 and 3, but also compounds of the general formula (I),

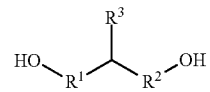

in which
R¹ and R² are each independently a divalent aliphatic, cycloaliphatic or aromatic radical which has 1 to 18 carbon atoms and may be interrupted by oxygen and/or nitrogen atoms, and
R³ is an alkoxy-terminated polyethylene oxide radical.

Nonionic hydrophilizing compounds are, for example, also monovalent polyalkylene oxide polyether alcohols having a statistical average of 5 to 70, preferably 7 to 55, ethylene oxide units per molecule, as obtainable in a manner known per se by alkoxylation of suitable starter molecules (for example in Ullmanns Encyclopädie der technischen Chemie, 4th edition, volume 19, Verlag Chemie, Weinheim p. 31-38).

Suitable starter molecules are, for example, saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, for example diethylene glycol monobutyl ether, unsaturated alcohols such as allyl alcohol, 1,1-dimethylallyl alcohol or olein alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine, and heterocyclic secondary amines such as morpholine, pyrrolidine, piperidine or 1H-pyrazole. Preferred starter molecules are saturated monoalcohols. Particular preference is given to using diethylene glycol monobutyl ether as starter molecule.

Alkylene oxides suitable for the alkoxylation reaction are especially ethylene oxide and propylene oxide, which can be used in the alkoxylation reaction in any sequence or else in a mixture.

The polyalkylene oxide polyether alcohols are either straight polyethylene oxide polyethers or mixed polyalkylene oxide polyethers, wherein the alkylene oxide units consist to an extent of at least 30 mol %, preferably to an extent of at least 40 mol %, of ethylene oxide units. Preferred nonionic compounds are monofunctional mixed polyalkylene oxide polyethers having at least 40 mol % of ethylene oxide units and not more than 60 mol % of propylene oxide units.

In a preferred embodiment, the polyurethane component A comprises a component A4 having at least one isocyanate-reactive group and at least one nonionically hydrophilizing group. Most preferably, the polyurethane component A comprises only a component A4 and no component A3.

Particularly preferred nonionically hydrophilizing components A4 are those compounds that bear at least two isocyanate-reactive groups.

Polyamine A5

Component A5 is selected from the group of the di- and/or polyamines that are used to increase the molar mass and are preferably added toward the end of the polyaddition reaction. Preferably, this reaction takes place in the aqueous medium. More preferably, the chain extension takes place in acetone. In that case, the di- and/or polyamines must be more reactive than water toward isocyanate groups of component (a). Examples include ethylenediamine, propylene-1,3-diamine, hexamethylene-1,6-diamine, isophoronediamine, phenylene-1,3- and -1,4-diamine, diphenylmethane-4,4'-diamine, amino-functional polyethylene oxides or polypropylene oxides obtainable under the Jeffamine® name, D series (from Huntsman Corp., Europe, Belgium), diethylenetriamine, triethylenetetramine and hydrazine. Preference is given to isophoronediamine, ethylenediamine, hexamethylene-1,6-diamine. Particular preference is given to ethylenediamine. In addition, it is also possible to use polyhydrazides as component A5; examples of these include adipic dihydrazide and carbohydrazide. Component A5 may in each case consist of a monomer or a mixture of two or more monomers.

Low Molecular Weight Polyol A6

In a preferred embodiment, the polyurethane component A according to the invention further comprises a polyol A6 (low molecular weight polyol) having a molecular weight of less than 400 g/mol.

Suitable low molecular weight polyols A6 are short-chain aliphatic, araliphatic or cycloaliphatic diols or triols, i.e. those containing 2 to 20 carbon atoms. Examples of diols are ethylene glycol, diethylene glycol, triethylene glycol, tetraethylene glycol, dipropylene glycol, tripropylene glycol, propane-1,2-diol, propane-1,3-diol, butane-1,4-diol, neopentyl glycol, 2-ethyl-2-butylpropanediol, trimethylpentanediol, positionally isomeric diethyloctanediols, 1,3-butylene glycol, cyclohexanediol, cyclohexane-1,4-dimethanol, hexane-1,6-diol, cyclohexane-1,2- and -1,4-diol, hydrogenated bisphenol A (2,2-bis(4-hydroxycyclohexyl)propane), 2,2-dimethyl-3-hydroxypropyl 2,2-dimethyl-3-hydroxypropionate. Preference is given to butane-1,4-diol, cyclohexane-1,4-dimethanol and hexane-1,6-diol. Suitable triols are trimethylolethane, trimethylolpropane or glycerol, preference being given to trimethylolpropane.

Hard Segment Content

The hard segment content of the polyurethane component A is preferably between 5% and 22% by weight, more preferably between 7% and 22% by weight, even more preferably between 8% and 22% by weight, even more preferably between 9% and 22% by weight, even more preferably between 10% and 22% by weight and most preferably between 11% and 22% by weight.

The hard segment content is calculated by the following formula:

[mol [OH groups]*59 g/mol+mol [NH or $NH_2$ groups]*58 g/mol]/solid resin

In general form:

(molar amount [OH]*molar mass of urethane group+ molar amount[NHR]*molar mass of urea group)/mass (solid resin)*100

In this context, R=H or $CH_2$—R'.

In this application, the hard segment content is also referred to synonymously as "density of hardening groups" or "concentration of hardening groups". What is meant—as can be inferred from the definitions given above—is always the ratio of the masses of urethane and urea groups to the total mass of the polyurethane component A.

Ratio of 100% Modulus to Hard Segment Content

The ratio of 100% modulus to hard segment content in a coating produced with the polyurethane dispersion according to the invention is preferably less than 17 MPa/% by weight, more preferably less than 15 MPa/% by weight and most preferably less than 13 MPa/% by weight.

The determination of the 100% modulus is preferably conducted under standard climatic conditions (20° C. and 65% air humidity) to DIN 53504, version 2009-10.

PARTICULAR EMBODIMENTS

When the proportion of PDI in the isocyanate component A1 is more than 80 mol %, the hard segment content of the polyurethane component A is preferably between 9% and 22% by weight, more preferably between 11% and 22% by weight. The ratio of 100% modulus to hard segment content, given the aforementioned proportions of hard segment and PDI, is preferably below 14 MPa/% by weight.

When the proportion of PDI in the isocyanate component A1 is more than 95 mol %, the hard segment content of the polyurethane component A is preferably between 9% and 22% by weight, more preferably between 11% and 22% by weight. The ratio of 100% modulus to hard segment content, given the aforementioned proportions of hard segment and PDI, is preferably below 14 MPa/% by weight.

When the proportion of PDI in the isocyanate component A1 is between 50 and 80 mol %, the hard segment content is preferably at least 10% by weight.

Advantages

As apparent from the working examples, the use of PDI rather than corresponding amounts of other aliphatic or cycloaliphatic polyisocyanates leads to coatings which, given an equal or higher density of urethane and urea groups, are much softer. The high content of urethane and urea groups is desirable since they bring about a high durability of the coating, for example to solvents.

Production of the Polyurethane Dispersion

The production of the polyurethane dispersion according to the invention can be conducted in one or more stages in a homogeneous phase or, in the case of multistage conversion, partly in a disperse phase. Polyaddition conducted in full or in part is followed by a dispersing, emulsifying or dissolving step. This is optionally followed by a further polyaddition or modification in disperse phase.

For production of the polyurethane dispersion according to the invention, it is possible to use all methods known from the prior art, such as emulsifier-shear force, acetone, prepolymer mixing, melt emulsification, ketimine and solid-state spontaneous dispersion methods or derivatives thereof. A summary of these methods can be found in Methoden der organischen Chemie [Methods of Organic Chemistry] (Houben-Weyl, Erweiterungs- and Folgebände zur 4. Auflage [Expansion and Supplementary Volumes for the 4th Edition], volume E20, H. Bartl and J. Falbe, Stuttgart, New York, Thieme 1987, p. 1671-1682). Preference is given to the melt emulsification method and the acetone method. Particular preference is given to the acetone method.

Typically, constituents A2 to A4 and A6 that do not have any primary or secondary amino groups and an isocyanate component A1, for preparation of a polyurethane polymer, are wholly or partly initially charged in the reactor and, optionally having been diluted with a water-miscible solvent which is inert toward isocyanate groups, but preferably without solvent, heated to higher temperatures, preferably in the range from 50 to 120° C.

Suitable solvents are, for example acetone, butanone, tetrahydrofuran, dioxane, acetonitrile, dipropylene glycol dimethyl ether and 1-methyl-2-pyrrolidone, which can be added not just at the start of the preparation but optionally also in portions at a later stage. Preference is given to acetone and butanone. It is possible to conduct the reaction under standard pressure for elevated pressure, for example above the standard pressure boiling temperature of an optionally added solvent, for example acetone.

In addition, it is possible to include catalysts that are known for acceleration of the isocyanate addition reaction, for example triethylamine, 1,4-diazabicyclo[2,2,2]octane, tin dioctoate or dibutyltin dilaurate, in the initial charge or to meter them in at a later stage. Preference is given to dibutyltin dilaurate.

Subsequently, any constituents that do not have any primary or secondary amino groups and have not yet been added at the start of the reaction are metered in. In the preparation of the polyurethane prepolymer, the molar ratio of isocyanate groups to isocyanate-reactive groups is 0.90 to 3, preferably 0.95 to 2, more preferably 1.05 to 1.5. The conversion level is typically monitored by following the NCO content of the reaction mixture. For this purpose, it is possible to undertake either spectroscopic measurements, for example infrared or near infrared spectra, determinations of the refractive index or chemical analyses, such as titrations, of samples taken. Polyurethane prepolymers containing free isocyanate groups are obtained in neat form or in solution.

During or after the preparation of the polyurethane prepolymers, if this has not yet been performed in the starting molecules, there is partial or complete formation of salts of the anionically and/or cationically dispersing groups. In the case of anionic groups, bases such as ammonia, ammonium carbonate or hydrogen carbonate, trimethylamine, triethylamine, tributylamine, diisopropylethylamine, dimethylethanolamine, diethylethanolamine, triethanolamine, potassium hydroxide or sodium carbonate are used for this purpose, preferably triethylamine, triethanolamine, dimethylethanolamine or diisopropylethylamine. The molar amount of the bases is between 50% and 100%, preferably between 60% and 90%, of the molar amount of the ionic groups. In the case of cationic groups, dimethyl sulphate or succinic acid are used. If only nonionically hydrophilized compounds A4 having ether groups are used, there is no need for the neutralization step. The neutralization can also be effected simultaneously with the dispersion, in that the dispersion water already contains the neutralizing agent.

Any isocyanate groups still remaining are converted by reaction with the polyamine A5. This chain extension can be conducted either in solvent prior to the dispersion or in water after the dispersion. If aminic components are present in A4, the chain extension preferably precedes the dispersion.

The polyamine A5 can be added to the reaction mixture having been diluted with organic solvents and/or with water. Preference is given to using 70% to 95% by weight of solvent and/or water. If two or more aminic components are present, the reaction can be effected successively in any desired sequence or simultaneously by addition of a mixture.

For the purpose of production of the polyurethane dispersion A, the polyurethane prepolymers, optionally under high shear, for example vigorous stirring, are either introduced into the dispersion water or, conversely, the dispersion water is stirred into the prepolymers. Subsequently, it is impossible, if this has not yet been done in the homogeneous phase, to increase the molar mass by reaction of any isocyanate groups present with component A5. The amount of polyamine A5 used depends on the unconverted isocyanate groups still present. Preferably 50% to 100% and more preferably 75% to 95% of the molar amount of the isocyanate groups is reacted with polyamines A5.

The resultant polyurethane-polyurea polymers have an isocyanate content of 0% to 2% by weight, preferably of 0% to 0.5% by weight.

The organic solvent can optionally be distilled off. The dispersions have a solids content of 20% to 70% by weight, preferably 30% to 65% by weight. The nonvolatile fractions of these dispersions have a content of chemical groups containing Zerewitinoff-active hydrogen atoms of 0 to 0.53 mmol/g, preferably of 0 to 0.4 mmol/g, more preferably of 0 to 0.25 mmol/g.

The polyurethane dispersion according to the invention is of particularly good suitability for coating of flexible substrates and fibres. Flexible substrates are preferably textiles, leather or flexible plastic surfaces. Fibres are preferably selected from the group consisting of glass fibres, polymer fibres and carbon fibres.

The term "fibre" is well known to the person skilled in the art. In this application, it refers to fibres that have not yet been processed further to a textile product. "Textile" and "textile product" refer in this application to woven, knitted and nonwoven fabrics.

In addition, the polyurethane dispersion according to the invention is suitable for production of synthetic leather.

Coating Composition

In order to improve the usability of the polyurethane dispersion according to the invention for the coating of the abovementioned substrates, said polyurethane dispersion is preferably formulated with further auxiliaries as a coating composition or fibre size.

Consequently, the present invention relates, in a further embodiment, to a coating composition comprising the above-defined polyurethane dispersion.

All definitions that have been given further up in this application in respect of the polyurethane dispersion according to the invention also apply to the coating composition according to the invention.

Preferably, the coating composition additionally comprises at least one additive selected from the group consisting of grip aids, pigments, dyes, antioxidants, hydrophobizing agents, curing agents, fillers, flame retardants, levelling agents, surface-active compounds, stabilizers, biocides and thickeners.

Preferred antioxidants are phenolic antioxidants.

In a further preferred embodiment of the present invention, the coating composition according to the invention comprises suitable crosslinkers B. Particularly suitable crosslinkers are aliphatic and/or aromatic polyisocyanates and/or blocked aromatic polyisocyanates having at least two NCO functions, preferably three or more NCO functions. The blocked or unblocked polyisocyanates can be used in solvent-free form or as solutions. Useful blocking agents for the polyisocyanates include ketoximes, for example methyl ethyl ketoxime, diisobutyl ketoxime, and also CH-acidic compounds such as malonic esters, acetoacetic esters or phenols, for example phenol, nonylphenol and other blocking agents such as caprolactam. Polyisocyanates of the type mentioned include biuretized, optionally uretdione-containing polyisocyanates formed from aliphatic or cycloaliphatic diisocyanates such as hexane diisocyanate and/or isophorone diisocyanate, cyanurates formed from hexane diisocyanate, isophorone diisocyanate, tolylene 2,4-/2,6-diisocyanate or optionally mixtures of such polyisocyanates or copolymerized polyisocyanates. Likewise suitable are reaction products of trimethylolpropane, glycerol, pentaerythritol or other polyols in a mixture with dialcohols such as diethylene glycol, butane-1,4-diol, dipropylene glycol and other diols with molar excesses of tolylene diisocyanates, diphenylmethane diisocyanates or isomer mixtures thereof, and also reaction products of dialcohols such as di- and triethylene glycol, di- and tripropylene glycol with molar excess amounts of tolylene diisocyanates or diphenylmethane diisocyanates, in homogeneous form or in a mixture.

The NCO content of the polyisocyanates having NCO groups in free or blocked form is preferably between 5% and 35% by weight, even more preferably between 10% and 20% by weight. Preferred blocking agents are butanone oxime, alkyl acetoacetates and/or alkyl malonates.

Based on the amount of the polyurethane A, the amount of the crosslinker B is preferably 2% to 10% by weight, more preferably 3% to 5% by weight.

In a further embodiment, the present invention relates to the use of the polyurethane dispersion according to the invention or of the coating composition according to the invention for coating of flexible substrates for textiles as defined further up in this application.

In yet a further embodiment, the present invention relates to a synthetic leather produced using the polyurethane dispersion according to the invention.

In yet a further embodiment, the present invention relates to a fibre or textile coated with the polyurethane dispersion according to the invention or with the coating composition according to the invention.

The working examples which follow serve to illustrate the invention. They are not intended to restrict the scope of protection of the claims.

EXAMPLES

Raw materials used:
Desmophen® PE 170 HN: polyester formed from adipic acid, hexanediol and neopentyl glycol, OHN 66, $Mn=1700$ $g \cdot mol^{-1}$ (Covestro Deutschland AG, Leverkusen, Germany).
Polyether LB 25: monofunctional polyether-based on ethylene oxide/propylene oxide having an ethylene oxide content of 84%, OHN 25, $Mn=2250$ $g \cdot mol^{-1}$ (Covestro Deutschland AG, Leverkusen, Germany).
Desmodur® I: IPDI, isophorone diisocyanate (Covestro Deutschland AG, Leverkusen, Germany).
Desmodur® H: HDI, hexamethylene 1,6-diisocyanate (Covestro Deutschland AG, Leverkusen, Germany).
PDI: pentamethylene diisocyanate (Covestro Deutschland AG, Leverkusen, Germany).
EDA: ethylenediamine (Aldrich, Germany).
IPDA: isophoronediamine (Aldrich, Germany)
AAS: diaminosulphonate, 45% in water, $H_2N-CH_2-CH_2-NH-CH_2-CH_2-SO_3Na$ (Covestro Deutschland AG, Leverkusen, Germany).
BDO: butane-1,4-diol (Aldrich, Germany)
PDO: propane-1,3-diol (Aldrich, Germany)

Methods Used:

The mechanical properties of the PU dispersions are determined on free films which are produced as follows:

In a film applicator consisting of two polished rolls that can be set at an exact separation, a release paper is inserted in front of the rear roll. A feeler gauge is used to set the distance between the paper and front roll. This distance corresponds to the (wet) film thickness of the resulting coating and can be adjusted to the desired application of each coat. Coating is also possible consecutively in several coats.

For application of the individual coats, the products, after adjustment of the viscosity to 4500 mPa·s by addition of anionic acrylic polymer, are poured onto the gap between the paper and the front roll, the release paper is pulled away vertically downward, and the corresponding film forms on the paper. If several coats are to be applied, each individual coat is dried and the paper is inserted again.

The solids contents were determined to DIN EN ISO 3251.

Unless explicitly mentioned otherwise, NCO contents were determined by volumetric means to DIN-EN ISO 11909.

The determination of the mechanical properties of these film samples is conducted to DIN 53504, version 2009-10, after storage under standard climatic conditions (20° C. and 65% air humidity) for 24 h. The mechanical film properties are determined after drying at 150° C. for 30 min.

The median particle sizes were determined by means of photocorrelation spectroscopy (Malvern Instruments, model: Zetasizer 1000).

Production of the PU Dispersions

Example 1 (Counter-Example)

425.0 g of the polyester polyol PE 170 HN are admixed with 75.2 g of HDI at 70° C. and then converted to the prepolymer at 100° C. until the theoretical NCO value (NCO theory=3.32%) has been attained. Thereafter, 889.2 g of acetone are added at 80° C. and the mixture is cooled to 40° C. and the prepolymer is dissolved. An aqueous chain extension solution composed of 28.3 g of AAS, 4.3 g of EDA and 109.4 g of water is added and then the mixture is stirred for 15 min. The product is dispersed in 651.0 g of water and then the acetone is distilled off at 120 mbar at 40° C. This gives rise to an aqueous dispersion of solids content 41.7% with a pH of 6.9 and a median particle size of 149 nm.

Example 2 (Inventive)

340.0 g of the polyester polyol PE 170 HN are admixed with 55.2 g of PDI at 70° C. and then converted to the prepolymer at 100° C. until the theoretical NCO value (NCO theory=3.31%) has been attained. Thereafter, 702.5 g of acetone are added at 80° C. and the mixture is cooled to 40° C. and the prepolymer is dissolved. An aqueous chain extension solution composed of 22.6 g of AAS, 3.5 g of EDA and 87.5 g of water is added and then the mixture is stirred for 15 min. The product is dispersed in 513.2 g of water and then the acetone is distilled off at 120 mbar at 40° C. This gives rise to an aqueous dispersion of solids content 39.6% with a pH of 6.6 and a median particle size of 180 nm.

Example 3 (Counter-Example)

346.0 g of the polyester polyol PE 170 HN and 4.4 g of BDO are admixed together with 75.8 g of HDI and then converted to the prepolymer at 100° C. until the theoretical NCO value (NCO=3.91%) has been attained. Thereafter, 757.6 g of acetone are added at 80° C. and the mixture is cooled to 40° C. and the prepolymer is dissolved. An aqueous chain extension solution composed of 33.3 g of AAS, 3.6 g of EDA and 118.1 g of water is added and then the mixture is stirred for 15 min. The product is dispersed in 530.7 g of water and then the acetone is distilled off at 120 mbar at 40° C. This gives rise to an aqueous dispersion of solids content 40.6% with a pH of 6.9 and a median particle size of 275 nm.

Example 4 (Inventive)

346.0 g of the polyester polyol PE 170 HN and 4.4 g of BDO are admixed together with 69.5 g of PDI and then converted to the prepolymer at 100° C. until the theoretical NCO value (NCO=3.97%) has been attained. Thereafter, 746.5 g of acetone are added at 80° C. and the mixture is cooled to 40° C. and the prepolymer is dissolved. An aqueous chain extension solution composed of 33.3 g of AAS, 3.6 g of EDA and 118.1 g of water is added and then the mixture is stirred for 15 min. The product is dispersed in 660.0 g of water and then the acetone is distilled off at 120 mbar at 40° C. This gives rise to an aqueous dispersion of solids content 34.7% with a pH of 6.7 and a median particle size of 240 nm.

Example 5 (Counter-Example)

312.8 g of the polyester polyol PE 170 HN and 13.7 g of BDO are admixed together with 100.8 g of HDI and then converted to the prepolymer at 100° C. until the theoretical NCO value (NCO=5.20%) has been attained. Thereafter, 759.6 g of acetone are added at 80° C. and the mixture is cooled to 40° C. and the prepolymer is dissolved. An aqueous chain extension solution composed of 52.8 g of AAS, 3.6 g of EDA and 171.5 g of water is added and then the mixture is stirred for 15 min. The product is dispersed in 481.4 g of water and then the acetone is distilled off at 120 mbar at 40° C. This gives rise to an aqueous dispersion of solids content 40.8% with a pH of 6.9 and a median particle size of 460 nm.

Example 6 (Inventive)

225.3 g of the polyester polyol PE 170 HN and 18.2 g of BDO are admixed together with 92.5 g of PDI and then converted to the prepolymer at 100° C. until the theoretical NCO value (NCO=6.63%) has been attained. Thereafter, 597.3 g of acetone are added at 80° C. and the mixture is cooled to 40° C. and the prepolymer is dissolved. An aqueous chain extension solution composed of 52.8 g of AAS, 3.6 g of EDA and 171.5 g of water is added and then the mixture is stirred for 15 min. The product is dispersed in 344.5 g of water and then the acetone is distilled off at 120 mbar at 40° C. This gives rise to an aqueous dispersion of solids content 43.5% with a pH of 6.9 and a median particle size of 245 nm.

Example 7 (Inventive)

425.0 g of the polyester polyol PE 170 HN are admixed with 77.1 g of PDI and then converted to the prepolymer at 100° C. until the theoretical NCO value (NCO=4.18%) has been attained. Thereafter, 892.6 g of acetone are added at 80° C. and the mixture is cooled to 40° C. and the prepolymer is dissolved. An aqueous chain extension solution composed of 43.3 g of AAS, 4.3 g of EDA and 150.6 g of water is added and then the mixture is stirred for 15 min. The product is dispersed in 614.3 g of water and then the acetone is distilled off at 120 mbar at 40° C. This gives rise to an aqueous dispersion of solids content 39.8% with a pH of 7.2 and a median particle size of 210 nm.

Example 8 (Counter-Example)

425.0 g of the polyester polyol PE 170 HN are admixed with 67.2 g of HDI and then converted to the prepolymer at 100° C. until the theoretical NCO value (NCO=2.56%) has been attained. Thereafter, 875.0 g of acetone are added at 80° C. and the mixture is cooled to 40° C. and the prepolymer is dissolved. An aqueous chain extension solution composed of 13.7 g of AAS, 4.3 g of EDA and 69.4 g of water is added and then the mixture is stirred for 15 min. The product is dispersed in 677.1 g of water and then the acetone is distilled off at 120 mbar at 40° C. This gives rise to an aqueous dispersion of solids content 41.9% with a pH of 7.1 and a median particle size of 370 nm.

Example 9 (Inventive)

425.0 g of the polyester polyol PE 170 HN are admixed with 61.6 g of PDI and then converted to the prepolymer at 100° C. until the theoretical NCO value (NCO=2.59%) has been attained. Thereafter, 865.2 g of acetone are added at 80° C. and the mixture is cooled to 40° C. and the prepolymer is dissolved. An aqueous chain extension solution composed of 13.7 g of AAS, 4.3 g of EDA and 69.4 g of water is added and then the mixture is stirred for 15 min. The product is dispersed in 668.8 g of water and then the acetone is distilled off at 120 mbar at 40° C. This gives rise to an aqueous dispersion of solids content 39.8% with a pH of 7.2 and a median particle size of 270 nm.

Example 10 (Inventive)

346.0 g of the polyester polyol PE 170 HN and 3.7 g of PDO are admixed together with 69.9 g of PDI and then converted to the prepolymer at 100° C. until the theoretical NCO value (NCO=3.97%) has been attained. Thereafter, 745.9 g of acetone are added at 80° C. and the mixture is cooled to 40° C. and the prepolymer is dissolved. An aqueous chain extension solution composed of 33.3 g of AAS, 3.6 g of EDA and 118.1 g of water is added and then the mixture is stirred for 15 min. The product is dispersed in 520.9 g of water and then the acetone is distilled off at 120 mbar at 40° C. This gives rise to an aqueous dispersion of solids content 37.4% with a pH of 7.0 and a median particle size of 145 nm.

Example 11 (Counter-Example)

345.4 g of the polyester polyol PE 170 HN and 4.6 g of PDO are admixed together with 80.6 g of HDI and then converted to the prepolymer at 100° C. until the theoretical NCO value (NCO=4.13%) has been attained. Thereafter, 765.7 g of acetone are added at 80° C. and the mixture is cooled to 40° C. and the prepolymer is dissolved. An aqueous chain extension solution composed of 42.2 g of AAS, 2.9 g of EDA and 137.2 g of water is added and then the mixture is stirred for 15 min. The product is dispersed in 568.5 g of water and then the acetone is distilled off at 120 mbar at 40° C. This gives rise to an aqueous dispersion of solids content 36.5% with a pH of 7.4 and a median particle size of 265 nm.

Example 12 (Inventive)

457.3 g of the polyester polyol PE 170 HN and 6.0 g of BDO are admixed together with a mixture of 50.4 g of HDI with 46.5 g of PDI and then converted to the prepolymer at 100° C. until the theoretical NCO value (NCO=3.97%) has been attained. Thereafter, 995.9 g of acetone are added at 80° C. and the mixture is cooled to 40° C. and the prepolymer is dissolved. An aqueous chain extension solution composed of 52.8 g of AAS, 3.6 g of EDA and 171.5 g of water is added and then the mixture is stirred for 15 min. The product is dispersed in 730.8 g of water and then the acetone is distilled off at 120 mbar at 40° C. This gives rise to an aqueous dispersion of solids content 37.1% with a pH of 7.4 and a median particle size of 195 nm.

Example 13 (Inventive)

285.3 g of the polyester polyol PE 170 HN and 12.1 g of BDO are admixed together with a mixture of 45.4 g of HDI with 41.8 g of PDI and then converted to the prepolymer at 100° C. until the theoretical NCO value (NCO=5.20%) has been attained. Thereafter, 683.9 g of acetone are added at 80° C. and the mixture is cooled to 40° C. and the prepolymer is dissolved. An aqueous chain extension solution composed of 47.5 g of AAS, 3.2 g of EDA and 154.3 g of water is added and then the mixture is stirred for 15 min. The product is dispersed in 810.8 g of water and then the acetone is distilled off at 120 mbar at 40° C. This gives rise to an aqueous dispersion of solids content 35.6% with a pH of 6.8 and a median particle size of 295 nm.

Example 14 (Inventive)

374.3 g of the polyester polyol PE 170 HN and 38.3 g of LB25 are admixed together with a mixture of 43.0 g of HDI with 39.7 g of PDI and then converted to the prepolymer at 100° C. until the theoretical NCO value (NCO=4.80%) has been attained. Thereafter, 880.6 g of acetone are added at 80° C. and the mixture is cooled to 40° C. and the prepolymer is dissolved. An aqueous chain extension solution composed of 33.8 g of IPDA, 2.6 g of EDA and 22.8 g of water is added and then the mixture is stirred for 15 min. The product is dispersed in 531.8 g of water and then the acetone is distilled off at 120 mbar at 40° C. This gives rise to an aqueous dispersion of solids content 49.3% with a pH of 5.9 and a median particle size of 185 nm.

Example 15 (Counter-Example)

374.3 g of the polyester polyol PE 170 HN and 38.3 g of LB25 are admixed together with a mixture of 56.9 g of IPDI with 43.0 g of HDI and then converted to the prepolymer at 100° C. until the theoretical NCO value (NCO=4.64%) has been attained. Thereafter, 911.0 g of acetone are added at 80° C. and the mixture is cooled to 40° C. and the prepolymer is dissolved. An aqueous chain extension solution composed of 33.8 g of IPDA, 2.6 g of EDA and 22.8 g of water is added and then the mixture is stirred for 15 min. The product is dispersed in 527.0 g of water and then the acetone is distilled off at 120 mbar at 40° C. This gives rise to an aqueous dispersion of solids content 49.3% with a pH of 6.1 and a median particle size of 200 nm.

Example 16 (Inventive)

312 g of the polyester polyol PE 170 HN and 32.0 g of LB25 are admixed together with a mixture of 33.0 g of PDI with 47.4 g of IPDI and then converted to the prepolymer at 100° C. until the theoretical NCO value (NCO=4.67%) has been attained. Thereafter, 754.4 g of acetone are added at 80° C. and the mixture is cooled to 40° C. and the prepolymer is dissolved. An aqueous chain extension solution composed of 28.2 g of IPDA, 2.2 g of EDA and 19.0 g of water is added and then the mixture is stirred for 15 min. The product is dispersed in 454.7 g of water and then the acetone is distilled off at 120 mbar at 40° C. This gives rise to an aqueous dispersion of solids content 49.3% with a pH of 5.6 and a median particle size of 220 nm.

Inventive Examples 2, 4, 6 and 10 show that the technical effect is independent of the theoretical NCO value of the prepolymer and hence of the relative isocyanate content. Moreover, the examples show that the number of carbon atoms in the polyol having a molar mass of <400 g/mol has no effect.

Inventive Examples 7 and 9 show that the technical effect occurs at different NCO/OH ratios.

Inventive Examples 12 and 13 show that the technical effect also occurs in the case of mixtures of two or more polyisocyanates when at least one isocyanate is pentamethylene diisocyanate.

Inventive Examples 14 and 16 show that the technical effect is also detectable in the case of nonionic polyurethane dispersions.

FIG. 1 is intended to illustrate the technical effect of the polyurethane dispersions according to the invention. It is apparent that the products according to the invention have a low 100% modulus in relation to the hard segment and hence low hardness. The effect is particularly marked in the case of those products containing exclusively PDI. The 100% modulus thereof in most cases is below 1.5, and even in the case of a very high hard segment content of 17% is still 1.7.

TABLE 1

| Example | Polyisocyanates | Hard segment/ [wt %] | 100% modulus/ [MPa] | Hardness quotient/ [MPa/ wt %] |
|---|---|---|---|---|
| 1* | HDI | 8.81 | 1.94 | 22.02 |
| 2 | PDI | 8.98 | 1.00 | 11.14 |
| 3* | HDI | 10.33 | 2.10 | 20.33 |
| 4 | PDI | 10.54 | 1.23 | 11.67 |
| 5* | HDI | 13.43 | 3.21 | 23.90 |
| 6 | PDI | 16.78 | 1.71 | 10.19 |
| 7 | PDI | 9.46 | 1.24 | 13.10 |
| 8* | HDI | 8.28 | 2.09 | 25.24 |
| 9 | PDI | 8.37 | 1.37 | 16.36 |
| 10 | PDI | 10.20 | 1.40 | 13.73 |
| 11* | HDI | 10.79 | 1.86 | 17.23 |
| 12 | HDI/PDI (50/50 mol %) | 10.39 | 1.44 | 13.86 |
| 13 | HDI/PDI (50/50 mol %) | 13.42 | 1.75 | 13.04 |
| 14 | HDI/PDI (50/50 mol %) | 10.36 | 1.15 | 11.10 |

TABLE 1-continued

| Example | Polyisocyanates | Hard segment/ [wt %] | 100% modulus/ [MPa] | Hardness quotient/ [MPa/ wt %] |
|---|---|---|---|---|
| 15* | HDI/IPDI (50/50 mol %) | 10.05 | 2.10 | 20.90 |
| 16 | IPDI/PDI (50/50 mol %) | 10.11 | 1.7 | 16.81 |

The invention claimed is:

1. A polyurethane dispersion comprising a polyurethane component A having a hard segment comprising
   (i) an isocyanate component A1 comprising at least one isocyanate, where the proportion of pentamethylene diisocyanate (PDI) in the isocyanate component A1 is at least 50 mol %;
   (ii) at least one component selected from the group consisting of a polyol A2 which has a number-average molecular weight of at least 400 g/mol and is amorphous in the polyurethane component A, and a polyol A6 having a molecular weight of less than 400 g/mol;
   (iii) at least one component selected from the group consisting of a compound A3 having at least two isocyanate-reactive groups and at least one ionically or potentially ionically hydrophilizing group and a compound A4 having at least one isocyanate-reactive group and at least one nonionically hydrophilizing group; and
   (iv) a polyamine A5;
   wherein the hard segment content of the polyurethane component A is between 5% and 22% by weight and the 100% modulus of a coating produced with the polyurethane dispersion is not more than 1.8 MPa.

2. The polyurethane dispersion according to claim 1, which comprises a polyol A2 and a polyol A6.

3. The polyurethane dispersion according to claim 1, which comprises a component A3 and a component A4.

4. The polyurethane dispersion according to claim 1, wherein the ratio of 100% modulus to hard segment content is less than 17.0 MPa/% by weight.

5. The polyurethane dispersion according to claim 1, wherein the hard segment content is at least 9.0% to 22% by weight.

6. The polyurethane dispersion according to claim 5, wherein the proportion of PDI in diisocyanate component A1 is at least 80 mol % and the ratio of 100% modulus to hard segment content is less than 14.0 MPa/% by weight.

7. The polyurethane dispersion according to claim 1, wherein the hard segment content is at least 10.0% to 22% by weight.

8. The polyurethane dispersion according to claim 7, wherein the proportion of PDI in diisocyanate component A1 is at least 50 mol % but less than 80 mol %.

9. Coating composition comprising the polyurethane dispersion according to claim 1.

10. The coating composition according to claim 9, additionally comprising an isocyanate component B.

11. A method comprising providing the polyurethane dispersion according to claim 1 and coating fibres or flexible substrates with the polyurethane dispersion according to claim 1.

12. Material selected from the group consisting of fibres or flexible substrates coated with the polyurethane dispersion according to claim 1.

13. Synthetic leather comprising the polyurethane dispersion according to claim 1.

* * * * *